United States Patent
Hasegawa et al.

(10) Patent No.: US 7,961,991 B2
(45) Date of Patent: Jun. 14, 2011

(54) DELAY DEMODULATION DEVICES

(75) Inventors: Junichi Hasegawa, Tokyo (JP);
Kazutaka Nara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 90 days.

(21) Appl. No.: 12/412,932

(22) Filed: Mar. 27, 2009

(65) Prior Publication Data
US 2010/0053731 A1    Mar. 4, 2010

(30) Foreign Application Priority Data

Mar. 27, 2008  (JP) .................................. 2008-083640

(51) Int. Cl.
*G02B 6/12*    (2006.01)
(52) U.S. Cl. ......................................... 385/14; 359/325
(58) Field of Classification Search .................... 385/14, 385/15, 39; 359/325
See application file for complete search history.

(56) References Cited

U.S. PATENT DOCUMENTS

| | | | |
|---|---|---|---|
| 6,961,492 B2 * | 11/2005 | Doerr ............................. | 385/39 |
| 7,259,901 B2 * | 8/2007 | Parsons et al. ................ | 359/237 |
| 2007/0177151 A1 * | 8/2007 | Isomura et al. ............... | 356/477 |
| 2010/0073760 A1 * | 3/2010 | Hasegawa et al. ............ | 359/325 |

FOREIGN PATENT DOCUMENTS

| | | |
|---|---|---|
| JP | 2007-60442 | 3/2007 |
| JP | 2007-151026 | 6/2007 |

OTHER PUBLICATIONS

U.S. Appl. No. 12/415,407, filed Mar. 31, 2009, Hasegawa, et al.

\* cited by examiner

*Primary Examiner* — Ellen Kim
(74) *Attorney, Agent, or Firm* — Oblon, Spivak, McClelland, Maier & Neustadt, L.L.P.

(57) ABSTRACT

The delay demodulation device 1 comprises an input waveguide 2 which receives DQPSK signals; a Y-branch waveguide 3 which splits the light waveguide 2; a first Mach-Zehnder interferometer (MZI) 4; and a second Mach-Zehnder interferometer 5. Both ends of the arm-waveguides 8, 9 of the MZI 4 and the both ends of the arm-waveguides 12, 13 of the MZI 5 are bent toward the center portion of the planar lightwave circuit (PLC) 1A. Thereby, the length of the arm-waveguides 8, 9 of the MZI 4 and the length of the arm-waveguides of the MZI 5 are shortened in the Z-direction. And, the length of the input couplers 6, 10 and the output couplers 7, 11 of the MZIs 4, 5 are shortened in the Z-direction. Therefore, the area covered by the MZIs 4, 5 can be made smaller.

11 Claims, 6 Drawing Sheets

DELAY DEMODULATION DEVICES

TECHNICAL FIELD

The present invention relates to a delay demodulation device used for optical fiber communications, and particularly, relates to a delay demodulation device equipped with PLC type-Mach-Zehnder interferometers, which demodulate DQPSK signals in Dense Wavelength Division Multiplexing (DWDM) transmission systems.

RELATED ARTS

Recently, with the rapid growth in broadband networks, high speed optical transmission systems (toward transmission rate of 40 Gbps) have been investigated actively. However, when the transmission rate is increased, the time duration per 1 bit of optical signals is reduced and, because of the characteristics of an optical fiber, signal waveforms are deteriorated, and therefore the quality of a communication line is deteriorated. For 40 Gbps-class Long-haul transmission systems, transponders that transform an optical signal to an electrical signal and then transform the electrical signal back to an optical signal are needed in the transmission path. Therefore, it is difficult to make a high speed optical transmission system using existing optical fiber networks.

Because of this issue, research and development has been done in Differential Quadrature Phase Shift Keying (DQPSK), which is able to reduce deterioration of signal waveforms by increasing the time duration per bit of an optical signal.

DQPSK is the phase shift keying method to transmit four informations corresponding to four different light phases. In other words, DQPSK transmits four data (0, 1, 2, 3) of each symbol, which comprises two bits of data, by changing light phases ($\theta$, $\theta+\pi/2$, $\theta+\pi$ or $\theta+3\pi/2$) of a carrier wave in accordance with the change of data between the adjacent symbols. 40 Gbps DQPSK transmission can transmit four times longer distance than conventional 40 Gbps transmission. Because of DQPSK, it is believed that construction of networks between large cities can be achieved using existing optical fiber networks.

For example, a conventional delay demodulation device which demodulates DQPSK signals or DPSK signals in a receiving device, are disclosed in Japanese Patent Publication document 1, and in Japanese Patent Publication document 2.

An optical receiving circuit disclosed in Japanese Patent Publication 2007-60442 (document 1) is equipped with Mach-Zehnder interferometers, which propagate return-to-zero (RZ) modulated DPSK signals through a pair of optical paths, which are equipped with a one-symbol delay element in one of the pair optical paths.

Also, a demodulation device disclosed in Japanese Patent Publication 2007-151026 (document 2) uses Michelson interferometers to demodulate DPSK or DQPSK optical signals.

When delay detection is performed in 40 Gbps DQPSK transmission systems, two PLC-type Mach-Zehnder interferometers are used to delay one symbol period (period for two bits). At that time, because free spectral range (FSR) is about 20 GHz, the difference $\Delta L$ in optical path length of each MZI increases, and therefore, circuit layout becomes relatively large. In the case of which the circuit layout becomes large, the temperature distribution in the surface of the PLC becomes large, and thereby the center wavelength can be shifted easily due to environment and temperature fluctuations. Also in the case, stress distribution in the surface of the PLC becomes larger, and thereby initial polarization dependent wavelength (PD$\lambda$) increases.

BRIEF SUMMARY OF THE INVENTION

The present invention seeks to overcome the above-identified problems. The purpose of the present invention is to provide a delay demodulation device with decreased temperature distribution and pressure distribution in the surface of a planar lightwave circuit (PLC).

To solve the above issue, a delay demodulation device with a planar lightwave circuit for demodulating DQPSK signals according to a first aspect of the present invention comprises: an input waveguide, which receives the DQPSK signals; a Y-branch waveguide, which splits the input waveguide; and a first Mach-Zehnder interferometer and a second Mach-Zehnder interferometer, each of the first and second Mach-Zehnder interferometers comprising: an input coupler, which is connected to one of the two waveguides split by the Y-branch waveguide; an output coupler, which is connected to output waveguides; and two arm-waveguides which have different lengths and are connected between the input coupler and the output coupler, wherein both ends of the two arm-waveguides on the first Mach-Zehnder interferometer and both ends of the two arm-waveguides on the second Mach-Zehnder interferometer are bent toward a center portion of the planar lightwave circuit.

According to the aspect, both ends of the two arm-waveguides on the first and second Mach-Zehnder interferometers are bent toward a center portion of the planar lightwave circuit (PLC), respectively. Therefore, if the direction that DQPSK signals propagate in the input waveguide is considered to be Z-direction, the length of two arm-waveguides on each Mach-Zehnder interferometer in the Z-direction is shortened. And, the directions of the input couplers and the output couplers of the Mach-Zehnder interferometers, i.e. the propagation direction of DQPSK signals in the couplers are tilted with respect to the Z-direction; therefore, the length of the input couplers and the output couplers on each Mach-Zehnder interferometers in the Z-direction is shortened.

Because the length of the two arm-waveguides on each Mach-Zehnder interferometer in the Z-direction and the length of the input couplers and the output couplers on each Mach-Zehnder interferometer in the Z-direction are shortened, areas covered by the first and second Mach-Zehnder interferometers can be made smaller; and therefore, the whole planar lightwave circuit of the delay demodulation device can be made smaller. This also reduces temperature and stress distributions within the planar lightwave circuit. Therefore, the delay demodulation device with little or no wavelength shift due to the environment and temperature fluctuation and small initial polarization dependent wavelength PDQ, can be made.

"DQPSK signals" are Differential Quadrature Phase Shift Keying signals, in which four data (0, 1, 2 or 3) of each symbol comprising two bits of data are modulated to light phases ($\theta$, $\theta+\pi/2$, $\theta+\pi$ or $\theta+3\pi/2$) of a carrier wave in accordance with the change of data between the adjacent symbols. Also, "a planar lightwave circuit" is a circuit, which includes an input waveguide, a Y-branch waveguide, and first and second Mach-Zehnder interferometers.

In a delay demodulation device according to a second aspect of the present invention, one of the two waveguides split by the Y-branch waveguide and the other waveguide are bent up and down to separate from each other, and the two waveguides are connected to an input end of the input coupler of the first and the second Mach-Zehnder interferometer, respectively; and the first and second output waveguides connected to the output coupler of the first Mach-Zehnder interferometer, and the third and fourth output waveguides connected to the output coupler of the second Mach-Zehnder interferometer are bent up and down to come close to each other.

According to the aspect, because the length of the two waveguides split by the Y-branch waveguide and the length of the four output waveguides on the Z-direction are shortened, the planar lightwave circuit of the delay demodulation device can be made smaller to further reduce temperature and stress distributions within the planar lightwave circuit.

In a delay demodulation device according to a third aspect of the present invention, the two arm-waveguides of each the first and second Mach-Zehnder interferometers have a difference $\Delta L$ in optical path length to give a phase delay of it in the DQPSK signal propagating in one of the two arm-waveguides with respect to the DQPSK signal propagating in the other arm-waveguide.

According to the aspect, by performing a phase trimming to adjust the phase difference between the first and second Mach-Zehnder interferometers $\pi/2$, optical signals (optical intensity signals) of which phases are shifted by $\pi/2$ each other can be output from the output ends of the four output waveguides (four output ports).

In a delay demodulation device according to a fourth aspect of the present invention, the input waveguide, the Y-branch waveguide, and the first and second Mach-Zehnder interferometers are waveguides in the planar lightwave circuit formed on a PLC base plate.

In a delay demodulation device according to a fifth aspect of the present invention, the PLC base plate has an approximately square planar shape.

In a delay demodulation device according to a sixth aspect of the present invention, the first Mach-Zehnder interferometer is formed in an upper center portion of the planar lightwave circuit and the second Mach-Zehnder interferometer 5 is formed in a lower center portion of the planar lightwave circuit In a delay demodulation device according to a seventh aspect of the present invention, the center portion of the two arm-waveguides of the first Mach-Zehnder interferometer and the center portion of the arm-waveguides of the second Mach-Zehnder interferometer are extended in parallel to each other.

In a delay demodulation device according to a eighth aspect of the present invention, a first delay portion is formed in the first and second output waveguides to match the optical length of the first and second output waveguides, and a second delay portion is formed in the third and fourth output waveguides to match the optical length of the third and fourth output waveguides.

According to the aspect, the first delayed portion matches the optical length of the first output waveguide with the second output waveguide, and the second delayed portion matches the optical length of the third output waveguide with the fourth output waveguide. Therefore, the optical signals of which phases are shifted by $\pi/2$ each other can be output from the four output waveguides. Thereby, a fiber array having four fibers can be directly connected to one end facet of a PLC chip, in which the output ends of the four output waveguides are formed.

In a delay demodulation device according to a ninth aspect of the present invention, at least one heater is formed on at least one of the two arm-waveguides of each the first and second Mach-Zehnder interferometer.

According to the aspect, it is able to adjust the phase difference between the first and second Mach-Zehnder interferometers $\pi/2$, by applying a voltage to either one heater of the first and second Mach-Zehnder interferometers or both heaters of the Mach-Zehnder interferometers.

In a delay demodulation device according to a tenth aspect of the present invention, a half-wave plate is inserted at the center portion of each the first and second Mach-Zehnder interferometer.

In a delay demodulation device according to a eleventh aspect of the present invention, a groove for inserting the half-wave plate, which passes through the center portions of the first and second Mach-Zehnder interferometers, is formed on the opposite side of the input waveguide with respect to the Y-branch waveguide.

According to the aspect, lights leaked from the Y-branch waveguide can be blocked by the groove. Thereby, it is able to prevent the recombination of the leaked lights in the output ends of the waveguides, which are DQPSK signals (light signals) leaked from the Y-branch waveguide. Thus, it is able to suppress the damage to characteristics.

In a delay demodulation device according to a twelfth aspect of the present invention, a portion which is a center portion of the groove and faces to the branch portion of the Y-branch waveguide is filled with a resin.

According to the aspect, leaked lights from the Y-branch waveguide are blocked by the resin filled in the groove. Thereby, it is able to prevent the recombination of the leaked lights, which are DQPSK signals (light signals) leaked from the Y-branch waveguide 3, in the output ports of the waveguides. Thus, it is able to effectively suppress the damage to characteristics.

According to the present invention, it becomes able to realize a delay demodulation device with decreased temperature distribution and pressure distribution in the surface of a planar lightwave circuit (PLC).

BRIEF DESCRIPTION OF THE DRAWINGS

The above and other objects and features of the invention will appear more fully hereinafter from a consideration of the following description taken into connection with the accompanying drawing wherein one example is illustrated by way of example, in which.

DETAILED DESCRIPTION OF THE INVENTION

Detailed description as follows;

The delay demodulation device according to one embodiment of the present invention is shown in FIG. 1 through FIG. 8.

Figure 1:
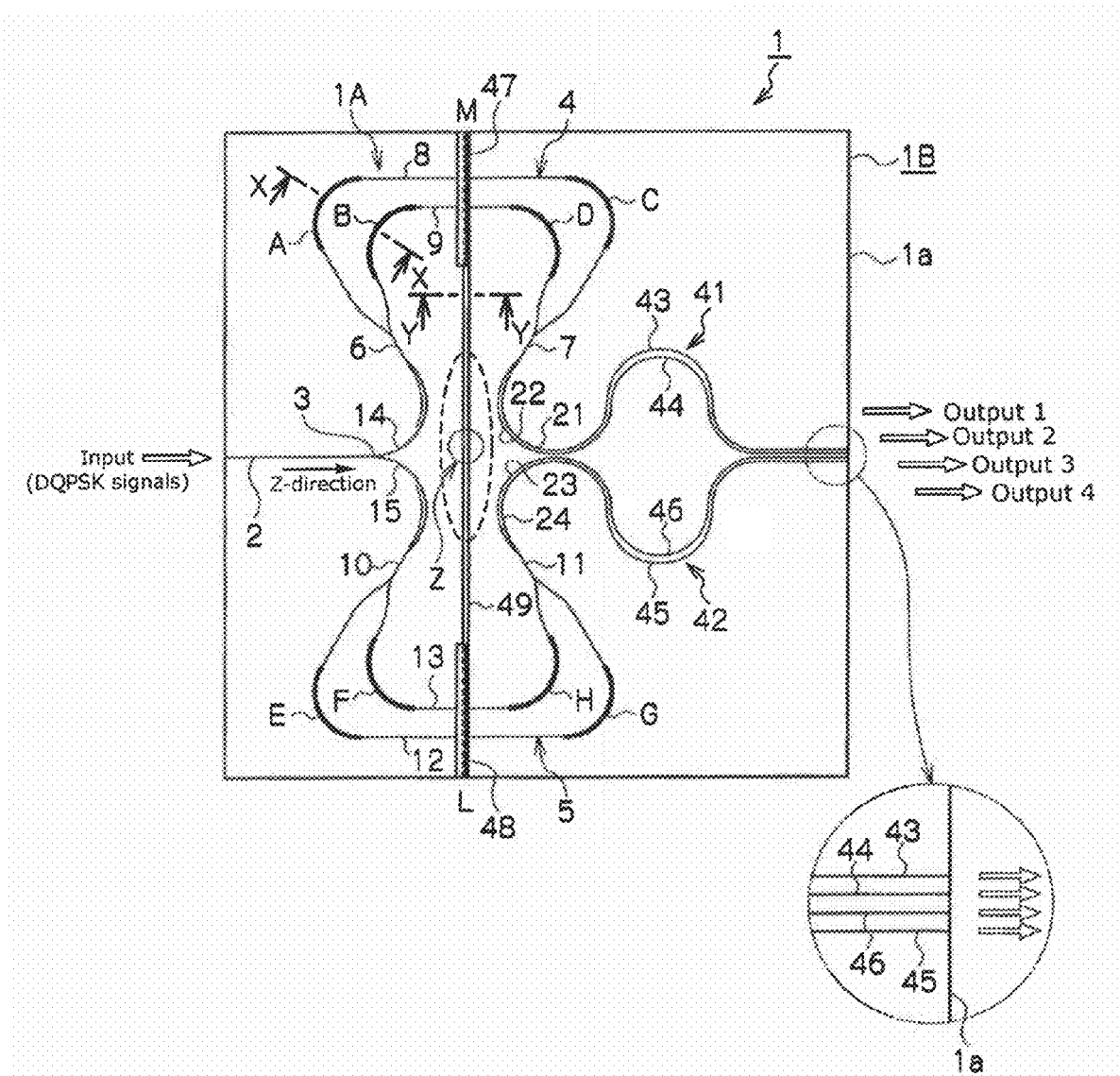
FIG. 1 is a plan view showing a schematic configuration of a delay demodulation device according to one embodiment of the present invention.
Figure 2:
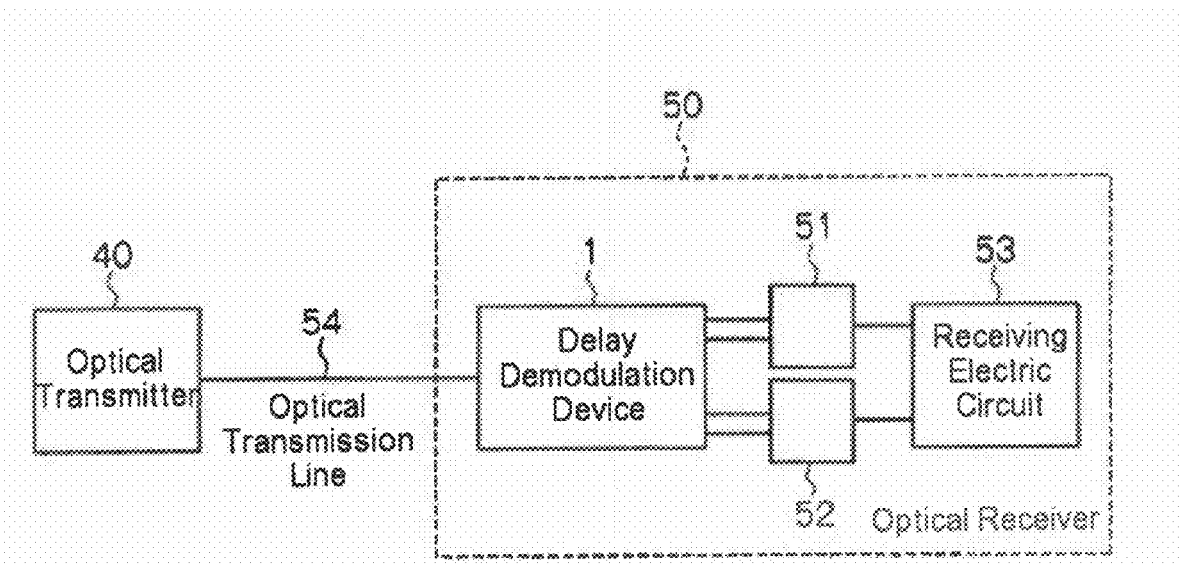
FIG. 2 is a block diagram showing a schematic configuration of an optical transmission system using a DQPSK method.
Figure 3:
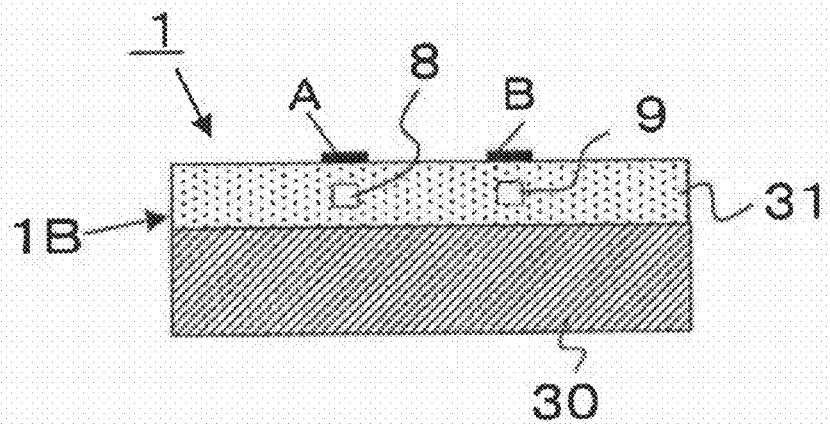
FIG. 3 is a cross-sectional view along line X-X in FIG. 1.
Figure 4:
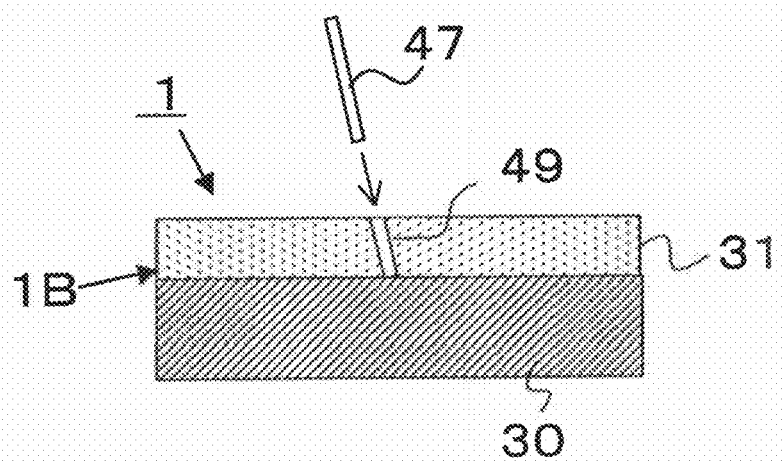
FIG. 4 is a cross-sectional view along line Y-Y in FIG. 1.
Figure 5:
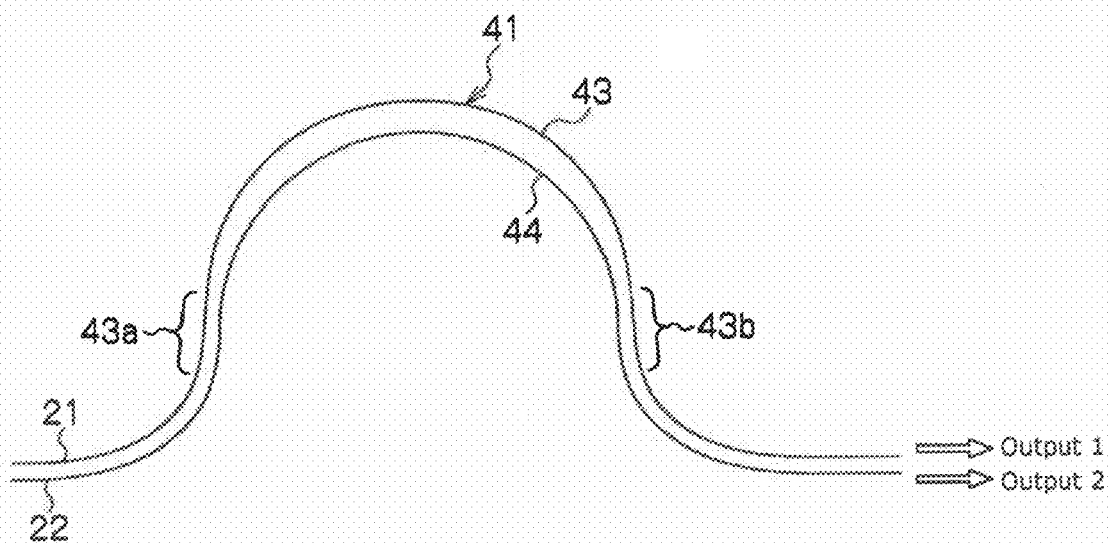
FIG. 5 is an enlarged view showing a first delay portion of the delay demodulation device shown in FIG. 1.
Figure 6:
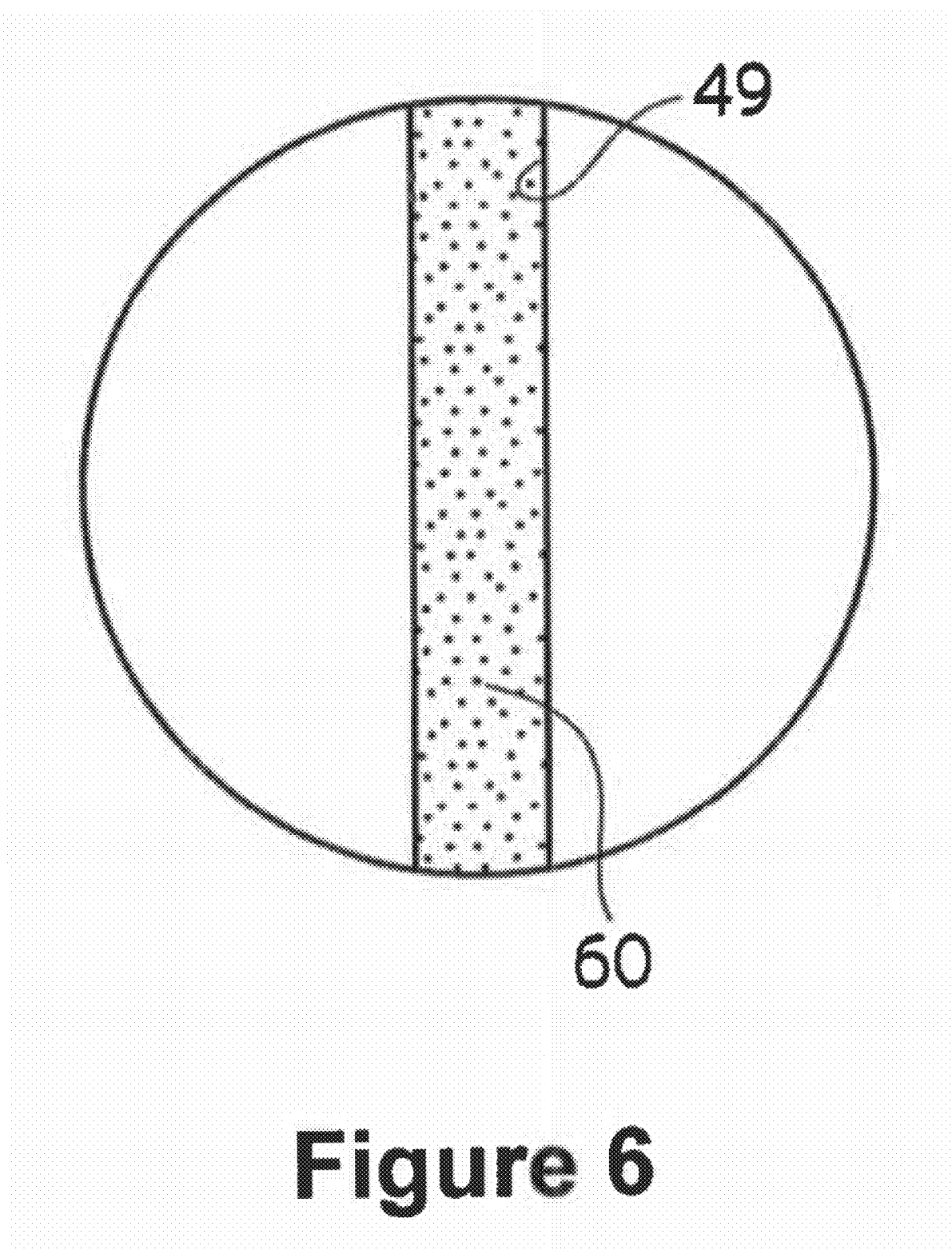
FIG. 6 is an enlarged view showing Z portion shown in FIG. 1.
Figure 7:
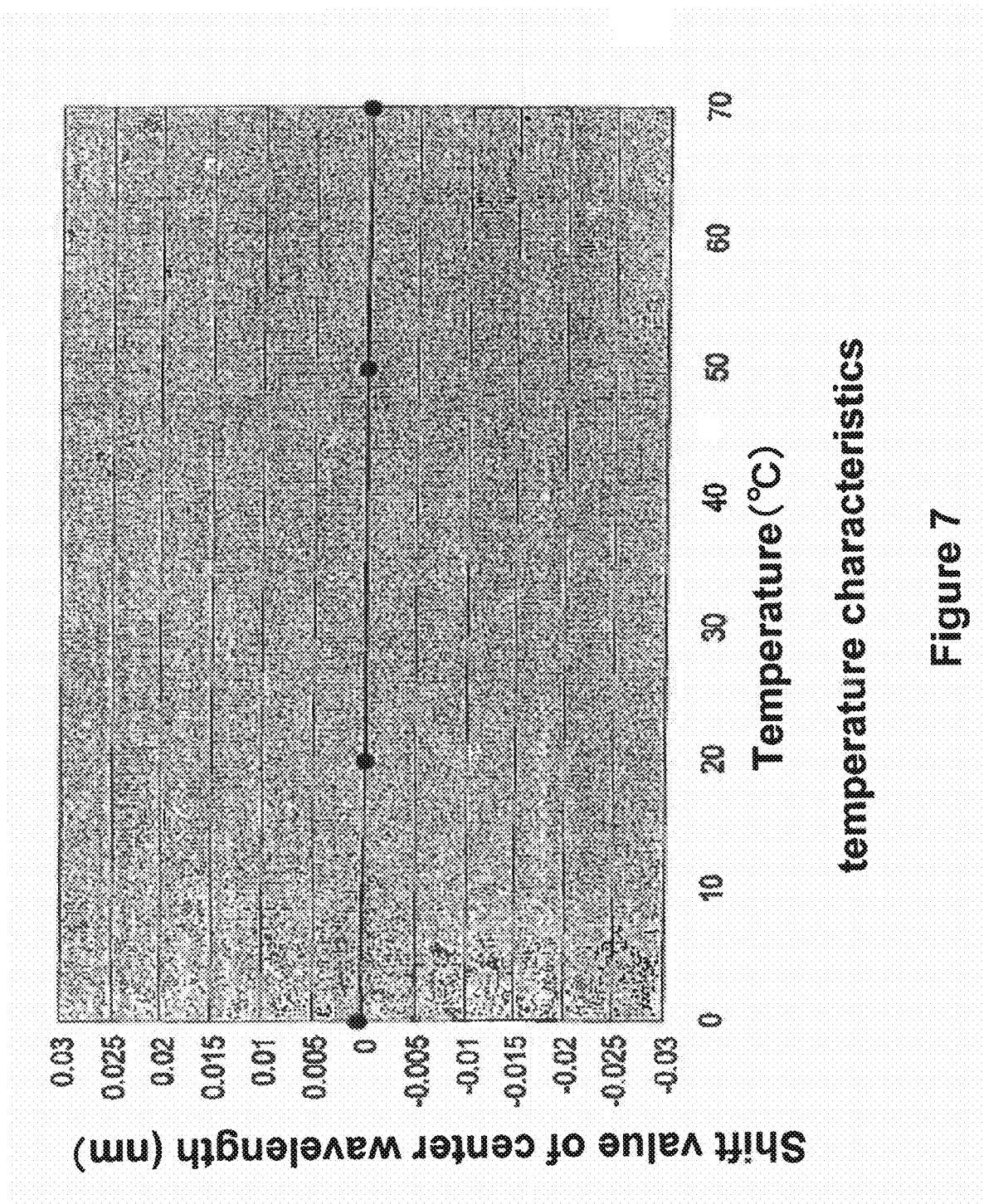
FIG. 7 is a graph showing the temperature characteristics of the delay demodulation device shown in FIG. 1.
Figure 8:
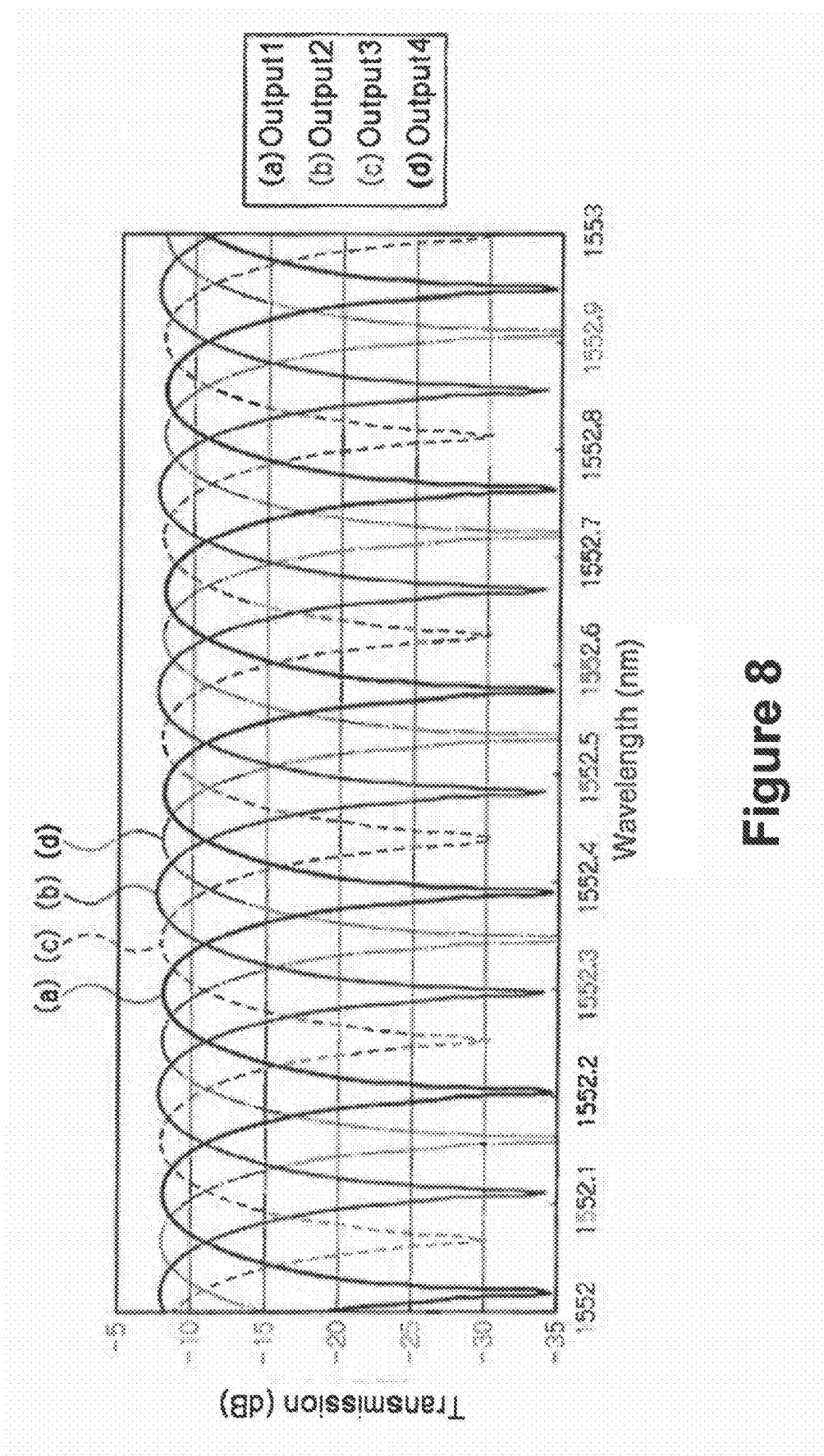
FIG. 8 is a graph showing a spectrum of the delay demodulation device.

FIG. 1 is a plan view showing a delay demodulation device according to one embodiment of the present invention. FIG. 2 is a block diagram showing a schematic configuration of an optical transmission system using a DQPSK method. FIG. 3 is a cross-sectional view along line X-X in FIG. 1 and FIG. 4 is a cross-sectional view along line Y-Y in FIG. 1. FIG. 5 is an enlarged view of a first delay portion of the delay demodulation device shown in FIG. 1 and FIG. 6 showing Z portion shown in FIG. 1. FIG. 7 is a graph showing the temperature characteristics of the delay demodulation device shown in FIG. 1 and FIG. 8 is a graph showing a spectrum of the delay demodulation device.

A delay demodulation device 1 shown in FIG. 1 is a planar lightwave circuit (PLC)-type delay demodulation device which demodulates DQPSK signals. The delay demodulation device 1 is, for example, a 40 Gbps DQPSK delay demodulation device used in a 40 Gbps DQPSK optical transmission system shown in FIG. 2.

In the optical transmission system, DQPSK signals are transmitted from an optical transmitter 40 to an optical fiber transmission line 54. DQPSK signals are signals in which four data (0, 1, 2 or 3) of each symbol comprising two bits of data are modulated to light phases (θ, θ+π/2, θ+π or θ+3π/2) of a carrier wave in accordance with the change of data between the adjacent symbols. DQPSK signals which are transmitted from the optical fiber transmission line 54 to an optical receiver 50 are converted to four optical intensity signals by the delay demodulation device 1, and furthermore, the optical intensity signals are converted to electric signals by balanced receivers 51 and 52. In a receiving electric circuit 53, various processes such as decryption process are performed.

The delay demodulation device 1 shown in FIG. 1 comprises an input waveguide 2, which receives DQPSK signals; a Y-branch waveguide 3, which splits the input waveguide 2; a first Mach-Zehnder interferometer 4; and a second Mach-Zehnder interferometer 5.

The first Mach-Zehnder interferometer 4 comprises an input coupler 6 connected to one of the two waveguides, which are split by the Y-branch waveguide 3; an output coupler 7 connected to output ends of output waveguides; and two arm-waveguides 8, 9, which are connected between the both couplers 6, 7. The two arm-waveguides 8, 9 have different lengths. Similarly, the second Mach-Zehnder interferometer 5 comprises: an input coupler 10 connected to the other waveguide of the two waveguides, which are split by the Y-branch waveguide 3; an output coupler 11 connected to output ends of output waveguides; and two arm-waveguides 12, 13, which are connected between the both couplers 10, 11. The two arm-waveguides 12, 13 have different lengths.

The input couplers 6, 10 and the output couplers 7, 11 are 2 input×2 output-type 3 dB couplers (50% directional couplers). One end of the input coupler 6 of the first Mach-Zehnder interferometer 4 is connected to the waveguide 14 which is split by the Y-branch waveguide 3, and one end of the input coupler 10 of the second Mach-Zehnder interferometer 5 is connected to the waveguide 15 which is split by the Y-branch waveguide 3.

Also, the two output ends (a through port and a cross port) of the output coupler 7 of the first Mach-Zehnder interferometer 4 are connected to the first and second output waveguides 21, 22, respectively. In a similar fashion, the two output ends (a through port and a cross port) of the output coupler 11 of the second Mach-Zehnder interferometer 5 are connected to the third and fourth output waveguides 23, 24, respectively.

Also, between the two arm-waveguides 8, 9 of the first Mach-Zehnder interferometer 4, there is a difference ΔL in optical path length to delay the phase of the DQPSK signals propagating in one arm-waveguide (arm-waveguide 8) by π, with respect to the DQPSK signals propagating in the other arm-waveguide (arm-waveguide 9). In a similar fashion, between the two arm-waveguides 12, 13 of the second Mach-Zehnder interferometer 5, there is a difference ΔL in optical path length to delay the phase of the DQPSK signals propagating in one arm-waveguide (arm-waveguide 12) by π, with respect to the DQPSK signals propagating in the other arm-waveguide (arm-waveguide 13).

Both ends of the arm-waveguides 8, 9 of the first Mach-Zehnder interferometer 4 and both ends of the arm-waveguides 12, 13 of the second Mach-Zehnder interferometer 5 are bent toward the center portion of the planar lightwave circuit (PLC) 1A, that is, the center portion of the PLC chip 1B having the planar lightwave circuit 1A as shown in FIG. 1. Here, "a planar lightwave circuit" is a circuit which includes an input waveguide 2, a Y-branch waveguide 3, and first and second Mach-Zehnder interferometers 4, 5, respectively made from silicate glasses. The delay demodulation device 1 comprising the planar lightwave circuit 1A is manufactured as follow.

With flame hydrolysis deposition (FHD) method, silica material ($SiO_2$-type glass particles), which becomes a lower cladding layer and a core layer, is deposited on a PLC base plate 30 as shown in FIG. 3, and then, the silica material is fused and made transparent by adding heat. Then, desired waveguides are formed by photolithography and reactive ion etching, and a upper cladding layer is formed with FHD method. In FIG. 3, a cladding layer 31 comprising the lower cladding layer and the upper cladding layer is formed on the PLC base plate 30, and the arm-waveguides 8, 9 are formed as the core layer inside of the cladding layer 31. The PLC base plate 30 is approximately made in a square planar shape as shown in FIG. 1.

Also, the two waveguides 14, 15 split by the Y-branch waveguide 3 are bent up and down to separate from each other, as shown in FIG. 1. One waveguide 14 of the two waveguides is connected to one of the two input ends of the input cupler 6 of the first Mach-Zehnder interferometer 4, and the other waveguide 15 is connected to one of the two input ends of the input cupler 10 of the second Mach-Zehnder interferometer 5. Here, if the propagation direction of DQPSK signals in the input waveguide 2 is considered to be the Z-direction (as shown in FIG. 1), the waveguide 14 are extended in an upward direction which is approximately perpendicular to the Z-direction and are bent with a curved waveguide portion. On the other hand, the waveguide 15 are extended in a downward direction which is approximately perpendicular to the Z-direction and are bent with a curved waveguide portion.

Also, the two output ends (a through port and a cross port) of the output coupler 7 of the first Mach-Zehnder interferometer 4 are connected to the first and second output waveguides 21, 22, respectively. In a similar fashion, the two output ends (a through port and a cross port) of the output coupler 11 of the second Mach-Zehnder interferometer 5 are connected to the third and fourth output waveguides 23, 24, respectively. The first and second output waveguides 21, 22, and the third and fourth output waveguides 23, 24 are bent up and down to come close to each other as shown in FIG. 1.

More specifically, the first and second output waveguides 21, 22 are extended from the two output ends of the output coupler 7 in a downward direction in FIG. 1 which is approximately perpendicular to the Z-direction and are bent with curved waveguide portions. Because of the curved waveguide portions, the length of the second output waveguide 22 is made to be longer than that of the first output waveguide 21. In similar fashion, the third and fourth output waveguides 23, 24 are extended from the two output ends of the output coupler 11 in an upward direction in FIG. 1 which is approximately perpendicular to the Z-direction and are bent with curved waveguide portions. Because of the curved waveguide portions, the length of the third output waveguide 23 is made to be longer than that of the fourth output waveguide 24.

The first Mach-Zehnder interferometer 4 is formed in an upper center portion of the planar lightwave circuit 1A, and the second Mach-Zehnder interferometer 5 is formed in a lower center portion of the planar lightwave circuit 1A as shown in FIG. 1. More specifically, the first and second Mach-Zehnder interferometers 4, 5 are formed at the symmetrical position with respect to a virtual center line on the PLC chip 1B, for example with respect to a straight line extended from the input waveguide 2 extending in the Z-direction.

The center portion of the arm-waveguides 8, 9 of the Mach-Zehnder interferometer 4 and the center portion of the arm-waveguides 12, 13 of the Mach-Zehnder interferometer 5 are extended in parallel to each other.

A first delay portion 41 is formed in the first and second output waveguides 21, 22 to match the optical path length of the two output waveguides 21, 22 as shown in FIG. 1. The first delay portion 41 includes a waveguide 43 connected to the first output waveguide 21, and a waveguide 44 connected to the second output waveguide 22 which is longer than the first output waveguide 21 as shown in FIGS. 1 and 5. The two waveguides 43, 44 of the first delay portion 41 are curved upward convexity with respect to the above mentioned virtual center line. The waveguide 43 has two straight portions 43a, 43b to lengthen the optical path length than the waveguide 44 as shown in FIG. 5. The output ends of the output waveguides 43, 44 of the first delayed portion 41 are output ports (a first output port and a second output port), which output optical signals (a), (b) of outputs 1, 2 (in FIG. 8), respectively, wherein the phase of the optical signals (a), (b) is shifted by $\pi$ with each other.

Also, a second delay portion 42 is formed in the third and fourth output waveguides 23, 24 to match the optical path length of the two output waveguides 23, 24. The second delay portion 42 includes a waveguide 45 connected to the fourth output waveguide 24, and a waveguide 46 connected to the third output waveguide 23 which is longer than the fourth output waveguide 24 as shown in FIG. 1. The two waveguides 45, 46 of the second delay portion 42 is curved downward convexity with respect to the above mentioned virtual center line. The waveguide 45 has two straight portions similar to the straight portions 43a, 43 in FIG. 5 to lengthen the optical path length than the waveguide 46. The output ends of output waveguides 46, 45 of the second delayed portion 42 are output ports (a first output port and a second output port), which output optical signals (c), (d) of outputs signals 3, 4 (in FIG. 8), respectively, wherein the phase of the optical signals (c), (d) is shifted by $\pi$ with each other.

The first Mach-Zehnder interferometer 4 includes a first heater A and a second heater C formed on the arm-waveguide 8, and a third heater B and a fourth heater D formed on the arm-waveguide 9. In similar fashion, the second Mach-Zehnder interferometer 5 includes a first heater E and a second heater G formed on the arm-waveguide 12, and a third heater F and a fourth heater H formed on the arm-waveguide 13. Heaters A~H are formed above the corresponding arm-waveguides, and are Tantalum-type thin layer heaters formed onto the upper cladding (the cladding layer 31 in FIG. 3) by sputtering. In FIG. 3, the heaters A, B formed above the cladding layer 31 of the arm-waveguides 8, 9 are shown.

Also, to reduce polarization dependent wavelength PD$\lambda$, half-wave plates 47, 48 are inserted at the center portions of the Mach-Zehnder interferometers 4, 5, respectively, as shown in FIG. 1. Groove 49 for inserting the half-wave plates 47, 48 is formed not only on the center portions of the Mach-Zehnder interferometers 4, 5, but also on the straight line M-L in FIG. 1, which passes through the center portions of Mach-Zehnder interferometers 4, 5. Also, to block leaked lights from the branch portion of the Y-branch waveguide 3, the groove 49 is formed on the opposite side of the input waveguide 2 with respect to the Y-branch waveguide 3.

Furthermore, the groove 49 is tilted by 8° to tilt the half-wave plates 47, 48 by 8° as shown in FIG. 4, to prevent loss due to reflections by the half-wave plates 47, 48. The center portion of the groove 49, that is a portion facing to the branch portion of the Y-branch waveguide 3 (Z portion in FIG. 1), is filled with a resin 60 to block the leaked lights from the branch portion of the Y-branch waveguide 3 more effectively, as shown in FIG. 6.

In the delay demodulation device 1, DQPSK signals (optical signals) transmitted from the optical fiber transmission line 54 to the optical receiver 50 are split by the Y-branch waveguide 3, and the DQPSK signals propagate in the two arm-waveguides 8, 9 which have different lengths. The Mach-Zehnder interferometer 4 shifts the phase of the DQPSK signals transmitted in one arm-waveguide 8 by one symbol ($\pi$) with respect to the other arm-waveguide 9. Similarly, the second Mach-Zehnder interferometer 5 shifts the phase of the DQPSK signals transmitted in one arm-waveguide 12 by one symbol ($\pi$) with respect to the other arm-waveguide 13.

The polarization dependent wavelength PD$\lambda$ of the delay demodulation device 1 is adjusted, for example, by driving the heaters A, C or the heaters B, D of the Mach-Zehnder interferometer 4. After the adjustment, a phase control (a phase trimming) is performed to make the phase difference of the two Mach-Zehnder interferometers 4, 5 $\pi/2$, for example, by driving the heaters A and C.

Embodiment

A delay demodulation device 1 for 40 Gbps DQPSK is fabricated, by forming a planar lightwave circui (PLC) 1A which includes an input waveguide 2; a Y-branch waveguide 3; Mach-Zehnder interferometers 4, 5; output waveguides 21-24 and two delayed portions 41, 42, on a silicon base plate 30 shown in FIG. 3, by using FHD method, photolithography and reactive ion etching.

In the fabricated delay demodulation device 1, in the case of which the refractive-index difference between the cladding layer and the core layer (fractional refractive index difference $\Delta$) is 1.5%, the size of the circuit (size of the PLC chip 1B) is 25 mm by 25 mm.

To reduce the initial polarization dependent wavelength PD$\lambda$, heaters on one of the two Mach-Zehnder interferometers 4, 5 are driven. Then, half-wave plates 47, 48 are inserted in groove 49, and a phase control (a phase trimming) is performed by driving heaters to make the phase difference of the two Mach-Zehnder interferometers 4, 5 $\pi/2$. Then, a fiber array having four optical fibers in a line is connected to an end facet 1a of the PLC chip 1B in which each end (output port) of output waveguides 43, 44, 45, 46 which output optical signals of the outputs 1-4 are formed, and a packaging is performed. Also, as a temperature control device, a Peltier element and a thermostat are used.

FIG. 7 shows the result of temperature characteristics of the fabricated delay demodulation device 1. FIG. 7 shows shift value of the center wavelength from the starting value at the through port (the output end 22 of the output coupler 7), in the case of which control temperature of the delay demodulation device 1 is set to 45° C. As being apparent from FIG. 7, it is obtained that the shift value are within ±0.5 pm. in the range of 0~70° C.

FIG. 8 shows a spectrum of a delay demodulation module including the delay demodulation device 1. FIG. 8 shows optical signals (a), (b) of the outputs 1, 2 which are outputted from the output ends (the first and second output ports) of the waveguides 43, 44 of the first delayed portion 41 and optical signals (c), (d) of the outputs 3, 4 which are outputted from the output ends (the third and fourth output ports) of the waveguides 46, 45 of the second delayed portion 42. As shown in FIG. 8, the optical signals (a), (b) are shifted by $\pi$ with respect to the optical signals (c), (d). The phase of the optical signals (a), (b), (c), (d) are shifted by $\pi/2$ with each other. It is apparent from FIG. 8 that desired characteristics of polarization dependent wavelength PD$\lambda$ less than 3 pm are obtained.

According to the embodiment presented above, the following advantages can be achieved.

Both ends of arm-waveguides 8, 9 on the first Mach-Zehnder interferometer 4 and both ends of arm-waveguide 12, 13 on the second Mach-Zehnder interferometer 5 are bent toward the center portion of the Planar Lightwave Circuit (PLC) 1A. Because of the construction, the length of two arm-waveguides 8, 9 of the Mach-Zehnder interferometer 4 and the length of two arm-waveguides 12, 13 of the Mach-Zehnder interferometer 5 in the Z-direction can be shortened. Also, because the directions of input couplers 6, 10 and output couplers 7, 11 of Mach-Zehnder interferometers 4, 5, that is, the propagation direction of DQPSK signals are tilted against the Z-direction, the length of the input couplers 6, 10 and the outputs couplers 7, 11 of Mach-Zehnder interferometers in the Z-direction can be shortened.

Because the length of the two arm-waveguides on each Mach-Zehnder interferometers 4, 5 in the Z-direction and the length of the input couplers and the output couplers on Mach-Zehnder interferometers 4, 5 in the Z-direction are shortened, areas covered by the first and second Mach-Zehnder interferometers 4, 5 can be made smaller; and therefore, the PLC 1A of the delay demodulation device 1 can be made smaller. Thereby, it becomes able to decrease temperature distribution and pressure distribution in the surface of a planar lightwave circuit 1A. Therefore, the delay demodulation device with little or no wavelength shift due to the environment and temperature fluctuation and small initial polarization dependent wavelength PIA can be obtained.

The two waveguides 14, 15 split by the Y-branch waveguide 3 are bent up and down to separate from each other, and the first and second output waveguides 21, 22 and the third and fourth output waveguides 23, 24 are bent up and down to come close to each other. According to the construction above, because the length of the two waveguides 14, 15 split by the Y-branch waveguide 3 in the Z-direction and the length of the four output waveguides 21-24 in the Z-direction are shortened, the planar lightwave circuit 1A of the delay demodulation device 1 can be made smaller to further reduce temperature and stress distributions within the planar lightwave circuit.

The first Mach-Zehnder interferometer 4 is formed in an upper center portion of the planar lightwave circuit 1A and the second Mach-Zehnder interferometer 5 is formed in a lower center portion of the planar lightwave circuit 1A. Therefore, the planar lightwave circuit 1A can be made even smaller.

A first delay portion 41 is formed in the first and second output waveguides 21, 22 to match the optical path length of the two output waveguides 21, 22. Also, a second delay portion 42 is formed in the third and fourth output waveguides 23, 24 to match the optical path length of the two output waveguides 23, 24. By the construction, it is able to match the optical path length of the first output waveguide 21 with the second output waveguide 22 by the first delayed portion 41, and match the optical path length of the third output waveguide 23 with the fourth output waveguide 24 by the second delayed portion 42. Therefore, it becomes able to output the optical signals of which phases are shifted by $\pi/2$ each other, from the four output waveguides. That is, it becomes able to output the optical signals of which phases are shifted by $\pi/2$ each other, from output ends (four output ports) of the waveguides 43, 44, 45, 46 respectively connected to the output waveguides 21, 22, 23, 24. Thereby, a fiber array having four optical fibers can be directly connected to the end facet 1a of the PLC chip 1B, at which outputs of the waveguides 43,44,45,46 are formed.

Groove 49 for inserting the half-wave plates 47, 48 is formed on the straight line M-L in FIG. 1, which passes through the center portions of Mach-Zehnder interferometers 4, 5. Also, the groove 49 is formed on the opposite side of the input waveguide 2 with respect to the Y-branch waveguide 3. By the construction, leaked lights from the branch portion of the Y-branch waveguide 3 can be blocked by the groove 49. Therefore, it is able to prevent the recombination of the leaked lights, which are DQPSK signals (light signals) leaked from the Y-branch waveguide 3, in the output ports of the waveguides. Thus, it is able to effectively suppress the damage to characteristics.

Because the center portion of the groove 49 is filled with a resin 60, it becomes able to block the leaked lights from the branch portion of the Y-branch waveguide 3 more effectively.

Because the half-wave plates 47, 48 are inserted to be tilted by 8° in the groove 49, it becomes able to suppress loss due to reflections by the half-wave plates 47, 48.

Because the half-wave plates 47, 48 are placed at the center portions of each Mach-Zehnder interferometer 4, 5, polarization dependent wavelength PD$\lambda$ can be reduced.

The two arm-waveguides 8, 9 of the first Mach-Zehnder interferometer 4 and the center portion of the two arm-waveguides 12, 13 of the second Mach-Zehnder interferometer 5 are extended in parallel to each other. Thereby, the size (the degree of projection toward outward) in the direction perpendicular to the Z-direction becomes smaller; therefore, the planar lightwave circuit 1A can be made even smaller.

The delay demodulation device 1 with an approximately square-shape PLC chip 1B can be obtained.

The delay demodulation device 1 shown in FIG. 1 includes two delayed portions 41, 42; however, the present invention can be applied to a delay demodulation device, which does not include any delayed portions. If the delay demodulation device does not have any delayed portions to match the optical path length of output waveguides 21-24, then delayed portions are placed outside of the PLC chip 1B. Furthermore, the fiber array is connected to the two delayed portions placed outside of the PLC Chip 1B.

The present invention is not limited to the above described embodiments and various and modifications may be possible without departing from the scope of the present invention.

What is claimed is:

1. A delay demodulation device formed on a chip including a Planar Lightwave Circuit (PLC) for demodulating Differential Quadrature Phase Shift Keying (DQPSK) signals, comprising:

an input waveguide, which receives the DQPSK signals, extending entirely in a one direction from a middle portion of an end face of the chip toward a center portion of the chip;
a Y-shape waveguide, which splits the input waveguide into two waveguides;
a first Mach-Zehnder interferometer comprising
 a first input coupler, which is connected to one of the two waveguides split by the Y-shape waveguide,
 a first output coupler, which is connected to first and second output waveguides, and
 two arm waveguides having different lengths with respect to each other and connected between the first input coupler and the first output coupler;
a second Mach-Zehnder interferometer comprising
 a second input coupler, which is connected to an other of the two waveguides split by the Y-shape waveguide,
 a second output coupler, which is connected to third and forth output waveguides, and
 two arm waveguides having different lengths with respect to each other and connected between the second input coupler and the second output coupler;
a first delay portion formed in the first and second output waveguides to match the lengths of the first and second output waveguides; and
a second delay portion formed in the third and fourth output waveguides to match the lengths of the third and forth output waveguides, wherein
ends of both the arm waveguides of the first Mach-Zehnder interferometer and ends of both the arm waveguides of the second Mach-Zehnder interferometer are bent toward a center portion of the PLC, and
the two waveguides split by the Y-shape waveguide, the first and second Mach-Zehnder interferometers, the output waveguides of the first Mach-Zehnder interferometer and the output waveguides of the second Mach-Zehnder interferometer, and the first and second delay portions are respectively formed at symmetrical positions on the chip with respect to a virtual centerline of the chip extending from the input waveguide in the one direction.

2. The delay demodulation device of claim 1, wherein
each end of the two arm waveguides of the first Mach-Zehnder interferometer and each end of the two arm waveguides of the second Mach-Zehnder interferometer are respectively bent toward the center portion of the chip,
one of the two waveguides split by the Y-shape waveguide is bent upward with respect to the virtual centerline of the chip and the other waveguide is bent downward with respect to the virtual centerline of the chip to create a space between the two,
the waveguide split by the Y-shape waveguide which is bent upward is connected to an input end of the first input coupler of the first Mach-Zehnder interferometer and the waveguide split by the Y-shape waveguide which is bent downward is connected to an input end of the second input coupler of the second Mach-Zehnder interferometer, and
the first and second output waveguides connected to the first output coupler of the first Mach-Zehnder interferometer are bent downward with respect to the virtual centerline of the chip and the third and fourth output waveguides connected to the second output coupler of the second Mach-Zehnder interferometer are bent upward with respect to the virtual centerline of the chip to come close to each other.

3. The delay demodulation device of claim 1, wherein
one of the two arm waveguides of each Mach-Zehnder interferometer has a difference in length $\Delta L$ with respect to the other arm waveguide of each Mach-Zehnder interferometer to create a phase shift of the DQPSK signal in one arm waveguide delay of $\pi$ radians with respect to the other.

4. The delay demodulation device of claim 1, wherein
the input waveguide, the Y-shape waveguide, and the first and second Mach-Zehnder interferometers are waveguides placed on a base plate.

5. The delay demodulation device of claim 4, wherein the base plate has an approximately square planar shape.

6. The delay demodulation device of claim 1, wherein
the first Mach-Zehnder interferometer is formed at an upper center portion above the virtual centerline of the chip and the second Mach-Zehnder interferometer is formed at a lower center portion below the virtual centerline of the chip.

7. The delay demodulation device of claim 1, wherein
center portions of the two arm waveguides of the first Mach-Zehnder interferometer and center portions of the two arm waveguides of the second Mach-Zehnder interferometer extend in parallel to each other.

8. The delay demodulation device of claim 1, further comprising
at least one heater is placed formed on at least one of the two arm waveguides of each Mach-Zehnder interferometer.

9. The delay demodulation device of claim 8, further comprising
a half-wave plate inserted at center portions of each Mach-Zehnder interferometer.

10. The delay demodulation device of claim 9, further comprising
a groove for inserting the half-wave plate, which passes through the center portions of the first and second Mach-Zehnder interferometers, formed on an opposite side of the input waveguide with respect to the Y-shape waveguide.

11. The delay demodulation device of claim 10, wherein a portion of the groove facing the Y-shape waveguide is filled with a resin.

* * * * *